US010668581B2

(12) United States Patent
Toffanello

(10) Patent No.: US 10,668,581 B2
(45) Date of Patent: Jun. 2, 2020

(54) DEVICE AND METHOD FOR APPLYING INSERTS ON SHEET SUPPORTS AND KIT FOR USING SUCH DEVICE

(71) Applicant: A.M.F. S.p.A., Bassano Del Grappa (VI) (IT)

(72) Inventor: Carmen Toffanello, Bassano Del Grappa (IT)

(73) Assignee: A.M.F. S.p.A., Bassano Del Grappa (VI) (IT)

( * ) Notice: Subject to any disclaimer, the term of this patent is extended or adjusted under 35 U.S.C. 154(b) by 170 days.

(21) Appl. No.: 15/896,328

(22) Filed: Feb. 14, 2018

(65) Prior Publication Data

US 2018/0229335 A1    Aug. 16, 2018

(30) Foreign Application Priority Data

Feb. 14, 2017  (IT) .................... 102017000015948

(51) Int. Cl.
*B23P 19/02*  (2006.01)
*B30B 9/00*  (2006.01)
(Continued)

(52) U.S. Cl.
CPC .............. *B23P 19/02* (2013.01); *A41H 37/00* (2013.01); *A41H 43/00* (2013.01); *B30B 9/00* (2013.01); *A41D 27/08* (2013.01)

(58) Field of Classification Search
CPC ......... B23P 11/00; B23P 11/027; B23P 15/16; B23P 15/50; B23P 15/52; B25B 11/00
See application file for complete search history.

(56) References Cited

U.S. PATENT DOCUMENTS 3,774,756 A    11/1973    Carlile et al.
5,223,316 A     6/1993    Nemzin et al.
(Continued)

FOREIGN PATENT DOCUMENTS

EP    2151169 A1    2/2010
EP    2434471 A1    3/2012
(Continued)

OTHER PUBLICATIONS

Search Report and Written Opinion issued by Italian Patent Office in Italian application No. IT 201700015948, dated Aug. 28, 2017 (7 pages with pp. 6-7 in English).

*Primary Examiner* — Lee D Wilson
(74) *Attorney, Agent, or Firm* — Jones Robb, P.L.L.C.

(57) ABSTRACT

The present disclosure relates to a device for applying inserts on skins, fabrics, clothes, or similar products. The device includes a first support having a constraining portion configured for being stably engaged to a bed of a press and a housing portion having a plurality of seats. The device also includes a second support having a respective auxiliary constraining portion configured for engaging a movable element of the press and an auxiliary housing portion having a predetermined number of auxiliary seats. The device also includes retaining elements, each having an external outline configured for being housed in a respective seat of the housing portion of the first support and a respective receiving seat for removably receiving an insert to be applied to a sheet support. A predetermined number of constraining elements are associable to the auxiliary seats and are configured for being constrained to the insert in use.

16 Claims, 10 Drawing Sheets

(51) Int. Cl.
*A41H 37/00* (2006.01)
*A41H 43/00* (2006.01)
*A41D 27/08* (2006.01)

(56) References Cited

U.S. PATENT DOCUMENTS

| | | | |
|---|---|---|---|
| 5,299,351 A * | 4/1994 | Takahashi | B23P 19/001 221/11 |
| 5,511,331 A | 4/1996 | Morosini | |
| 5,662,849 A * | 9/1997 | Bogue | A23G 3/10 264/109 |
| 5,709,027 A * | 1/1998 | Kato | H01R 43/01 29/33 M |
| 2002/0053124 A1 | 5/2002 | Scarfia | |
| 2005/0076998 A1 | 4/2005 | Buffum et al. | |
| 2015/0251256 A1* | 9/2015 | Frenken | B25B 27/146 100/234 |
| 2018/0229335 A1* | 8/2018 | Toffanello | A41H 37/00 |

FOREIGN PATENT DOCUMENTS

| | | |
|---|---|---|
| GB | 1123797 | 8/1968 |
| IT | 0001399834 | 6/2009 |

* cited by examiner

DEVICE AND METHOD FOR APPLYING INSERTS ON SHEET SUPPORTS AND KIT FOR USING SUCH DEVICE

RELATED APPLICATION

This Application claims foreign priority to Italian Application No. 102017000015948, filed on Feb. 14, 2017, in Italy, the entire content of which is incorporated by reference herein.

TECHNICAL FIELD

The present disclosure relates to a device and an associated method for applying inserts on sheet supports.

More particularly, the device and method have the object of applying inserts as letters, numbers or symbols on skins, fabrics, clothes, or similar sheet products for customizing the sheet support itself.

BACKGROUND

The articles of clothing or leather and the fashion accessories are often enhanced by decorative elements reproducing trademarks, logos, scripts and/or images.

In the fashion field, and also in other fields, there is a widespread technique of fixing to the article of clothing or, generally, to the fabric or skin, strings of alphanumeric characters representing words, trademarks, logos or more generally alphanumeric codes.

More and more often, such decorations are getting fundamental elements for identifying an enterprise or a determined product. Consequently they are taking a relevant importance.

Due to their commercial importance, such decorative elements were progressively improved over time, to the extent that they have taken now particularly elegant and renowned configurations.

Specifically, besides the traditional printed customizations, embossed decorations formed by single metal inserts, which are suitably applied to a product to be characterized, were devised.

These alphanumeric codes typically consist of a set of letters, numbers and symbols made, according to the requirements, of metal and/or plastic material, and can be fixed to a fabric by several known methods.

If a string is formed by a single stiff piece, these known methods can include fixing the whole string on the fabric by a single operation by means of known techniques such as, for example, by punching or riveting. First, an inconvenience of this assembly method is the local loss of resilience and flexibility in the fabric where the string is fixed because the string is a stiff element, certainly less flexible than the fabric on which the string is applied.

An alternative to this mounting method consists of fixing individually the characters if the string is not made in a single piece in order to make the characters independent from each other.

Therefore, both the flexibility and resilience of the fabric remain substantially unaltered.

Unfortunately, this latter solution has some inconveniences, among them, long mounting times because the characters are individually fixed on the fabric and the consequent possibility of misalignments among the characters.

In a further alternative, a widespread method entails the engagement of an insert including several characters, obtained by a single micro-melt. Then, after fixing them on a fabric/skin, the runners and feeds are eliminated. The described system does not enable complete elimination of the burrs and process residuals which, consequently, leads to a substantial degradation of the aesthetic value of the insert.

In order to eliminate or at least reduce the above briefly cited inconveniences, the inventor in the past has developed a system for simultaneously applying the inserts according to what is disclosed in the Italian patent No. IT0001399834. This technique provides a single support removably bearing the string of inserts to be applied to the fabric. The single support has a plurality of seats each counter-shaped to the single insert to be applied. In this way, the single support enables maintaining an accurate alignment of the alphanumeric string during the application step. Once the inserts are constrained, the support itself is removed and then discarded. In this way, a customized product is obtained wherein each insert is accurately aligned and finished, and simultaneously separated from the others.

European patent EP2434471 discloses a similar technique by which it is possible to apply a plurality of separated inserts to a support.

The described current techniques, which are nowadays coming onto the market, also in the haute couture/luxury accessories markets, are however further improvable, particularly with reference to the customization aspect.

Actually, the idea of a support bearing the inserts enables accurately aligning the characters and optimally positioning the same without defects of any type. Unfortunately it restricts the customization of a product, because it requires a user to decide beforehand what string must be applied and then the support reproducing this latter.

This entails, on one side, the requirement of applying the string itself on many products for reducing the costs of this technology, and on the other side, the impossibility of customizing the finished product after its sale. This de facto restricts a customer's freedom to decide which characters/strings to apply, for example, when he/she is buying the product.

SUMMARY

Therefore, the object of some embodiments of the present disclosure consists of substantially solving the outlined problems of the prior art, while maintaining the high-quality level met by the same products on the market.

A main object consists of enabling easy customization of an article, which can be also selected right before making the alphanumeric string, for example, when the article is bought.

It is also an object to enable to decide both the length of the string, in other words the number of the inserts, and also the contents of the same, in order to quickly satisfy such choices.

Ancillary objects consist of maintaining as low as possible the manufacturing cost and enabling implementation of the method and the use of the device also outside the manufacturing field, in other words also in shops, outlets and similar, by the operators of such entities.

According to a first aspect of the present disclosure, a device (1) for applying inserts (11) on sheet supports (S), for example on skins, fabrics, clothes, or similar products, comprises:

a first support (2) for a press (3) having a constraining portion (4) configured for rigidly engaging a bed (3a) of the press (3) and a housing portion (5) having a plurality of seats (6);

a second support (7) for a press (3) having a respective auxiliary constraining portion (8) configured for engaging an element (3b) of the press (3) and an auxiliary housing portion (9) having a predetermined number of auxiliary seats (10), the first and second supports (2, 7) being relatively movable towards/away from each other along a displacement direction (21);

a plurality of inserts (11) to be applied on the sheet support (S);

a plurality of retaining elements (12), each having an external outline (12a) configured for being housed in a respective seat (6) of the housing portion (5) of the first support (2), and a respective housing seat (13) for removably receiving one of said inserts (11);

a predetermined number of constraining elements (14) associable to said predetermined number of auxiliary seats (10) of the auxiliary housing portion (9) of the second auxiliary support (7) and configured for being constrained, in use, to the inserts (11).

In a second aspect according to the first aspect, the housing portion (5) of the first support (2) is removably engaged with the constraining portion (4). For example, the constraining portion (4) has a main set (4a) adapted to receive and retain the housing portion (5).

In a third aspect according to anyone of the preceding aspects, the housing portion (5) of the first support (2) comprises a plurality of seats (6) side-by-side along a main direction (15).

In a fourth aspect according to anyone of the preceding aspects, the seats (6) have the same external shape adapted to receive respective retaining elements (12) having the same external outline (12a).

In a fifth aspect according to anyone of the preceding aspects, the retaining elements (12) have the same external outline (12a) adapted to be received in said seats (6).

In a sixth aspect according to anyone of the preceding aspects, the seats (6) have a polygonal external shape, for example with four main sides, or a rectangular or square one.

In a seventh aspect according to anyone of the preceding aspects, each seat (6) has an open external shape and has at least one passage (16) adapted to enable to house a projecting portion (17) of the retaining elements (12).

In an eighth aspect according to the seventh aspect, the passage (16) is defined by a channel developing from an external side of the housing portion (5) of the first support (2) to the interior of the seat (6).

In a ninth aspect according to anyone of the preceding aspects, each retaining element (12) has a projecting portion (17) emerging in the main development plane of the retaining element and configured for being housed in a respective passage (16) of the seat (6).

In a tenth aspect according to anyone of the preceding aspects, each seat (6) has a polygonal external shape having indentations (18) at joining areas of two contiguous sides of the outline.

In an eleventh aspect according to anyone of the preceding aspects, the seat (6) and external outline (12a) of the retaining element (12) are counter-shaped to each other.

In a twelfth aspect according to anyone of the preceding aspects, the seats (6) have a depth slightly less than or substantially equal to a thickness of the retaining elements (12).

In a thirteenth aspect according to anyone of the preceding aspects, the housing portion (5) of the first support (2) comprises two seats (6) or, more in detail, at least three seats or more.

In a fourteenth aspect according to anyone of the preceding aspects, the first support (2) is a lower support fixed to the bed and the second support (7) is an upper support movable towards/away from the first support (2).

In a fifteenth aspect according to anyone of the preceding aspects, the position of the first support (2) is adjustable with respect to the bed of the press (3). For example, the device may comprise an adjusting arrangement for configuring the first support (2) in a plurality of different relative positions stable with respect to the bed.

In a sixteenth aspect according to anyone of the preceding aspects, the position of the second support (7) is adjustable with respect to the movable element of the press (3). For example, the device may include an auxiliary adjusting arrangement for configuring the second support (7) in a plurality of different relative positions stable with respect to the movable element.

In a seventeenth aspect according to anyone of the preceding aspects, the constraining portion (4) has a main seat (4a) adapted to receive and retain the position of the housing portion (5), the device comprising a plurality of housing portions (5) having the same external shape configured for being received in the main seat (4a) and retained in position by the constraining portion (4), said plurality of housing portions being different from each other in the number of seats (6).

In an eighteenth aspect according to anyone of the preceding aspects, the inserts (11) are defined by letters, numbers, and/or symbols.

In a nineteenth aspect according to anyone of the preceding aspects, each insert (11) has at least one and optionally at least two pins (19) emerging from the main plane of the insert away from the first support (2), In a twentieth aspect according to the preceding aspects, different inserts (11) have a position of the pins (19) different with respect to the external outline (12a) of the retaining element (12) bearing them.

In a twenty-first aspect according to anyone of the preceding aspects, the retaining elements (12) are made of a plastic material, optionally of nylon.

In a twenty-second aspect according to anyone of the preceding aspects, the retaining elements (12) have respective receiving seats (13) counter-shaped to the insert (11) which they borne.

In a twenty-third aspect according to anyone of the preceding aspects, the receiving seats (13) of the retaining element (12) have elements for removably retaining the position of the inserts, said retaining elements being, for example, undercuts, tapers of the lateral wall of the receiving seats and/or of the inserts, an interference fit between the receiving seats and the inserts.

In a twenty-fourth aspect according to anyone of the preceding aspects, the receiving seats (13) of the retaining elements (12) are through seats.

In a twenty-fifth aspect according to anyone of the preceding aspects, the inserts (11) are made of a metal material, for example of a metal alloy such as zama.

In a twenty-sixth aspect according to anyone of the preceding aspects, the predetermined number of auxiliary seats (10) of the auxiliary housing portion (9) is a single seat (10).

In a twenty-seventh aspect according to the preceding aspects, the predetermined number of constraining elements (14) is a single constraining element (14) comprising engaging elements for receiving the plurality of inserts (11) by a permanent constraint.

In a twenty-eighth aspect according to the preceding twenty-sixth aspect, the device further comprises a supporting body (20) removably housing a plurality of constraining elements (14) and configured for being coupled to the single auxiliary seat (10).

In a twenty-ninth aspect according to anyone of the preceding aspects, the predetermined number of auxiliary seats (10) of the auxiliary housing portion (9) comprises a plurality of seats (10).

In a thirtieth aspect according to the preceding aspect, the predetermined number of constraining elements (14) comprises a plurality of constraining elements (14) each comprising engaging elements for receiving a respective insert (11) by a permanent constrain.

In a thirty-first aspect according to anyone of the preceding aspects, the constraining element (14) comprises engaging elements for receiving at least one insert (11) by a permanent constraint, said engaging elements comprising, for example, seats (21) for receiving respective pins (19) of the inserts (11), the seats (21) being optionally through.

In a thirty-second aspect according to the thirty-first aspect, and the twentieth aspect, the constraining elements (14) for the different inserts (11) have seats (21) positioned in different areas, with a position corresponding to the one of the pins (19) of the insert (11) to which they are stably coupled.

In a thirty-third aspect according to anyone of the preceding aspects, the constraining element (14) is made of a metal material, or plastic material, or of metal and plastic materials together.

In a thirty-fourth independent aspect, it is made a kit for devices (1) for applying inserts (11) on sheet supports (S), for example on skins, fabrics, clothes, or similar products, comprising:
a plurality of inserts (11) to be applied to the sheet support (S);
a plurality of retaining elements (12), each having an external outline (12a) configured for being housed in a respective seat (6) of a first support (2) of a press and a respective receiving seat (13) for removably receiving one of said inserts (11);
a predetermined number of constraining elements (14) associable to a second auxiliary support (7) and configured for being constrained, in use, to the inserts (11).

In a thirty-fifth aspect according to the thirty-fourth aspect, the retaining elements (12) have the same external outline (12a).

In a thirty-sixth aspect according to the thirty-fourth or the thirty-fifth aspect, the retaining elements (12) have a substantially polygonal external shape, for example with four main sides, or a rectangular or square one.

In a thirty-seventh aspect according to any of the thirty-fourth to thirty-sixth aspects, each retaining element (12) has a projecting portion (17) emerging in the main development plane of the retaining element (12), said projecting portion (17) being, for example, in the shape of an elongated tab for enabling to handle the retaining element.

In a thirty-eighth aspect according to any of the thirty-fourth to thirty-seventh aspects, wherein the inserts (11) are defined by letters, numbers and/or symbols.

In a thirty-ninth aspect according to any of the thirty-fourth to thirty-eighth aspects, each insert (11) has at least one and optionally two pins (19) emerging from the main plane of the insert away from the first support (2).

In a fortieth aspect according to any of the thirty-fourth to thirty-ninth aspects, the different inserts (11) have a position of the pins (19) different from the external outline (12a) of the retaining element (12) bearing them.

In a forty-first aspect according to any of the thirty-fourth to fortieth aspects, the retaining elements (12) are made of a plastic material, optionally of nylon.

In a forty-second aspect according to any of the thirty-fourth to forty-first aspects, the retaining elements (12) have respective receiving seats (13) counter-shaped to the insert (11) which they borne.

In a forty-third aspect according to any of the thirty-fourth to forty-second aspects, the receiving seats (13) of the retaining elements (12) have an arrangement for removably retaining the position of the inserts, said retaining arrangement being, for example, undercuts, tapers of the lateral wall of the receiving seats and/or of the inserts, an interference fit between the receiving seats and inserts.

In a forty-fourth aspect according to any of the thirty-fourth to forty-third aspects, the receiving seats (13) of the retaining elements (12) are through seats.

In a forty-fifth aspect according to any of the thirty-fourth to forty-fourth aspects, the inserts (11) are made of a metal material, for example a metal alloy, such as zama.

In a forty-sixth aspect according to any of the thirty-fourth to forty-fifth aspects, the predetermined number of constraining elements (14) is a single constraining element (14) comprising engaging elements for receiving the plurality of inserts (11) by a permanent constraint.

In a forty-seventh aspect according to any of the thirty-fourth to forty-sixth aspects, the kit further comprises a supporting body (20) removably housing a plurality of constraining elements (14).

In a forty-eighth aspect according to any of the thirty-fourth to forty-seventh aspects, the predetermined number of constraining elements (14) comprise a plurality of constraining elements (14), each comprising engaging elements for receiving a respective insert (11) by a permanent constraint.

In a forty-ninth aspect according to any of the thirty-fourth to forty-eighth aspects, the constraining element (14) comprises engaging elements for receiving at least one insert (11) by a permanent constraint, said engaging elements comprising for example seats (21) for receiving respective pins (19) of the inserts (11), the seats (21) being optionally through.

In a fiftieth aspect according to the forty-ninth aspect and to the thirty-ninth aspect, wherein the constraining elements (14) for the different inserts (11) have seats (21) positioned in different areas with a position corresponding to the one of the pins (19) of the insert (11) to which they are stably coupled.

In a fifty-first aspect according to any of the thirty-fourth to fiftieth aspects, the constraining element (14) is made of a metal or plastic material or of metal and plastic materials together.

In a fifty-second aspect according to any of the thirty-fourth to fiftieth aspects, each constraining element (14) has the same plan shape.

In a fifty-third independent aspect, a method for applying inserts (11) on sheet supports (S), for example on skins, fabrics, clothes, or similar products, comprises:
positioning a plurality of retaining elements (12) in a housing portion (5) of the first support (2) for a press (3) having a constraining portion (4) configured for rigidly engaging a bed (3a) of the press (3) and said housing portion (5) having a plurality of seats (6), each retaining element (12) having an external outline (12a) configured for being housed in the respective seat (6) of the housing portion (5) of the first support (2), each retaining element (12) having a respective receiving seat (13) for removably receiving one of said inserts (11), each retaining element being capable of being positioned in any of said seats (6) according to a sequence of inserts to be made, engaged with the sheet support (S);

positioning a predetermined number of constraining elements (14) in an auxiliary housing portion (9) of a second support (7) for a press having a respective auxiliary constraining portion (8) configured for engaging an element (3b) of the press (3) and an auxiliary housing portion (9) having the predetermined number of auxiliary seats (10);

positioning the sheet support (S) with which the inserts will be engaged between said first and second supports (2, 7);

closing said press by approaching the first and second supports (2, 7) for exerting a pressure on said inserts (11) and said constraining elements (14) for obtaining a stable coupling of the same, the sheet support (S) being interposed in between;

opening said press for extracting said sheet support (S) bearing on a side thereof the plurality of inserts (11) and on the other one, the predetermined number of constraining elements (14).

In a fifty-fourth aspect according to the fifty-third aspect, the step of positioning the plurality of retaining elements (12) on the housing portion (5) comprises the sub-step of positioning a retaining element in a specific seat (6), removing the retaining element previously positioned in the specific seat, and positioning the same in another seat of said plurality of seats.

In a fifty-fifth aspect according to any of the fifty-third and fifty-fourth aspects, the method further comprises a step of removing the housing portion (5) from the constraining portion (4) and of coupling a different housing portion (5) to the constraining portion (4), said different housing portion (5) having a different number of seats (6) with respect to the removed housing portion.

In a fifty-sixth independent aspect, it is provided the use of the kit according to any of the thirty-fourth to fifty-second aspects for applying strings of different inserts one following the other on sheet supports (S), for example by the device according to any of the first to thirty-third aspects.

BRIEF DESCRIPTION OF THE DRAWINGS

The description will be given with reference to some possible embodiments of a device for applying inserts on sheet supports, for example on skins, fabrics, clothes or similar products, according to what is shown and illustrated in the following exemplifying and therefore non-restrictive figures.

DETAILED DESCRIPTION

Figure 1:
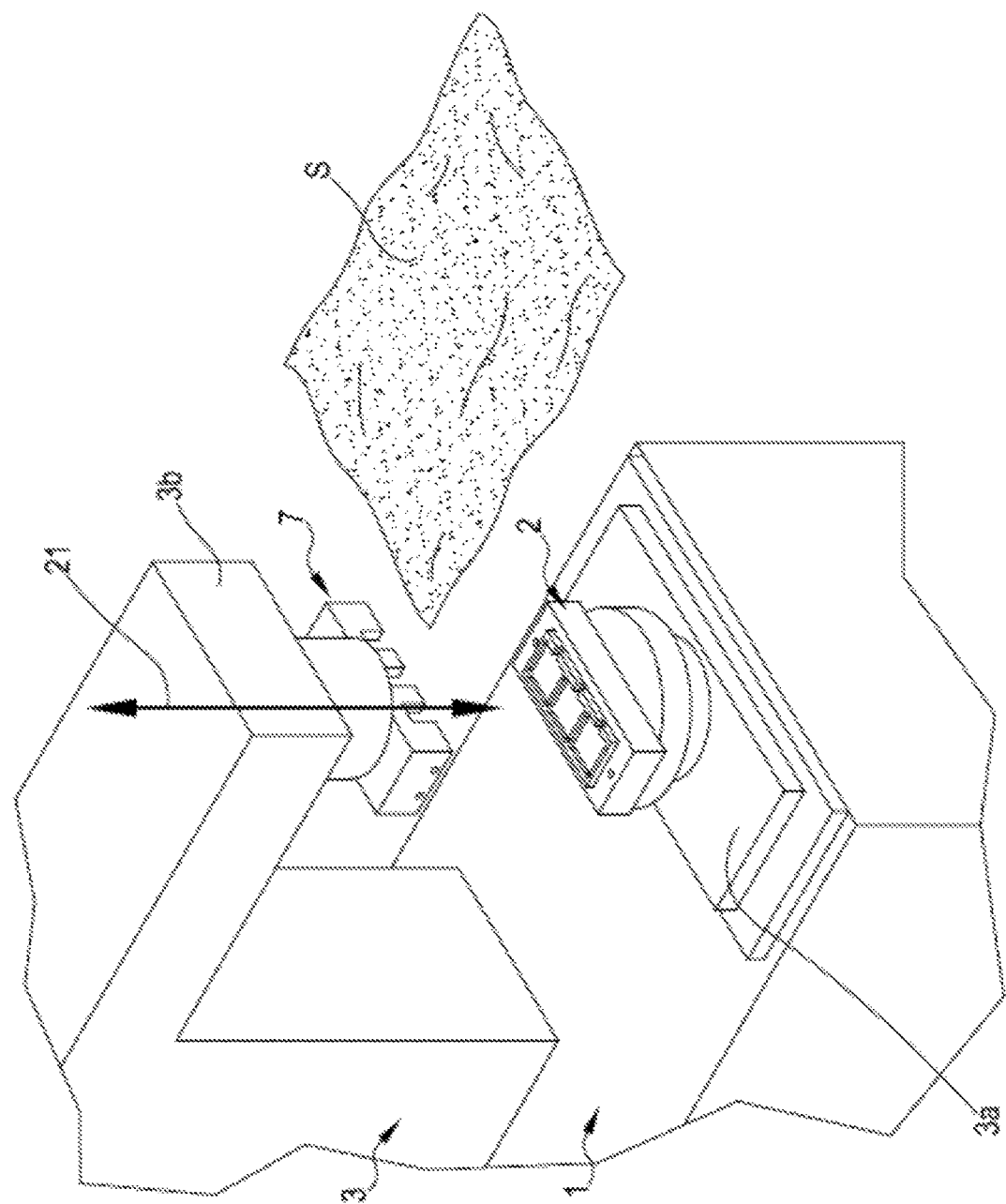
FIG. 1 illustrates a simplified view of an exemplary press on which embodiments of the device of the present disclosure may be applied.

With reference to the attached drawings, FIG. 1 shows an exemplary device 1 for applying inserts 11 on sheet supports S, for example on skins, fabrics, clothes, or similar products.

As shown in FIG. 1, the device 1 may be used with a press 3 (only schematically shown as a standard type) provided with a bed 3a which supports a movable element (or ram) 3b moving towards and away from the bed 3a of the press 3 for enabling to exert a suitable pressure on the interposed elements and to enable to couple the inserts 11 and respective counter-plates, as described and detailed in the following.

Figure 2:
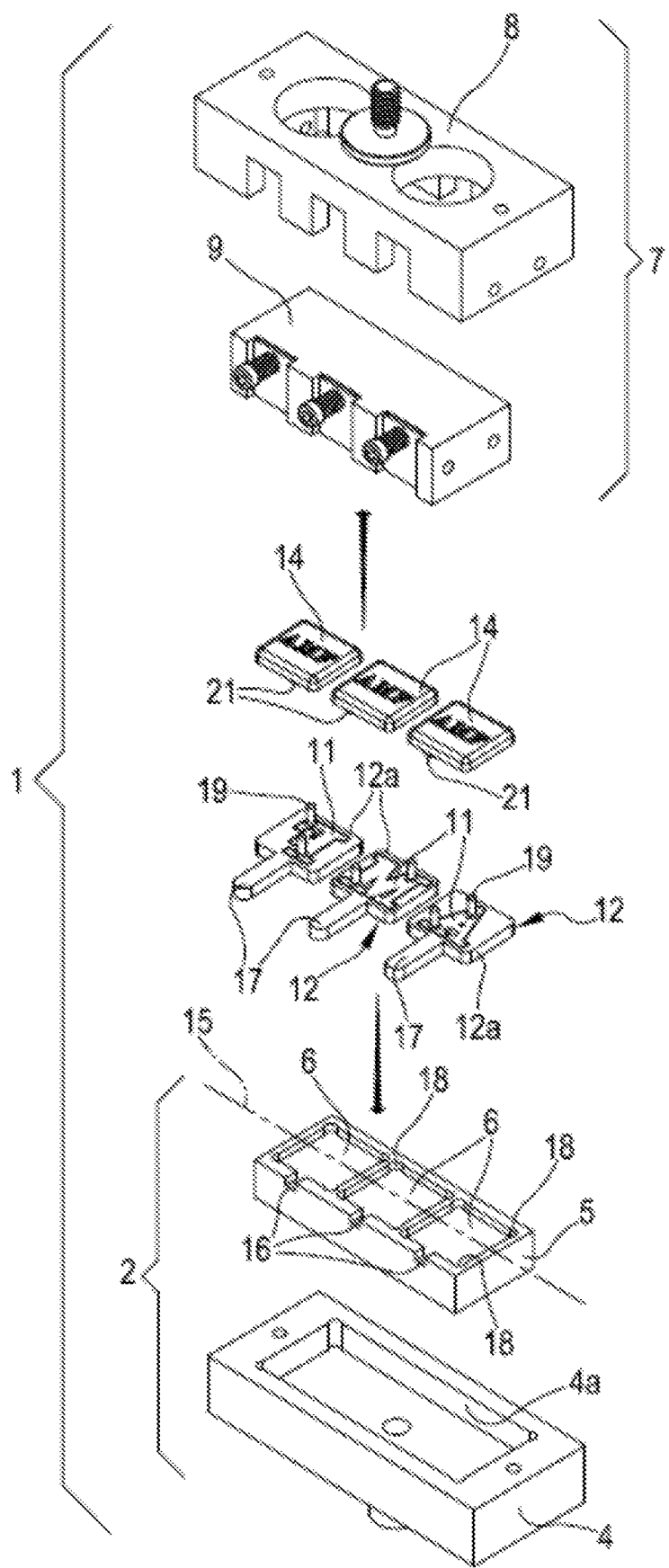
FIG. 2 shows an exploded view of an exemplary device of the present disclosure.

As shown in FIG. 2, the device 1 may be provided with a first lower support 2 having a constraining portion 4 configured for stably engaging the bed 3a of the press 3. The first support 2 also includes a housing portion 5 having a plurality of seats 6.

The illustrated embodiment of FIG. 2 shows the first support 2 formed by two separated elements, the constraining portion 4 and the housing portion 5. In some embodiments, the housing portion 5 of the first support 2 is removably engaged with the constraining portion 4 for being capable of applying to the constraining portion 4 different housing portions 5, for substituting the beforehand mounted one, for the objects and reasons explained in the following.

In some embodiments, the constraining portion 4 has a main seat 4a located above and adapted to receive and retain in position the housing portion 5. The seat 4a is for example a substantially rectangular shape counter-shaped to the plan size of the part of the housing portion 5 which must be inserted and coupled to the main seat 4a. The depth of the main seat 4a is lower than the height or thickness of the housing portion 5 so that this latter projects above the constraining portion 4. Additional systems for making integral the two portions 4 and 5 in use, such as for example attachment dowels or screws or similar stably coupling systems, can be provided.

The presence of a main seat 4a enables a simpler and quick engagement of the selected housing portion 5 in the work position (already adjusted) so that the same can be easily substituted with a different one as a function of the requirements of the moment. Other equivalent systems for constraining together the two portions 4 and 5 could be adopted without falling out of the scope of the present disclosure.

Therefore, in a different embodiment (not illustrated), the two portions 4 and 5 could be integrally made, in other words can be formed by a same single body.

It is observed that the first support 2, and specifically the constraining portion 4, is engaged with the bed 3a of the press 3 in an adjusted way, in other words, the same is constrained and the position thereof with respect to the bed 3a can be finely changed (adjusted) so that the different components of the device 1 can be accurately aligned and the press 3 can operate with a high precision during the hammering step for constraining the inserts 11.

By acting in this way, the constraining portion 4, once correctly positioned on the press 3, is secured and does not move again and further adjusting or registering operations are not required, neither when the housing portion 5 should be substituted by a different one.

Figure 6:
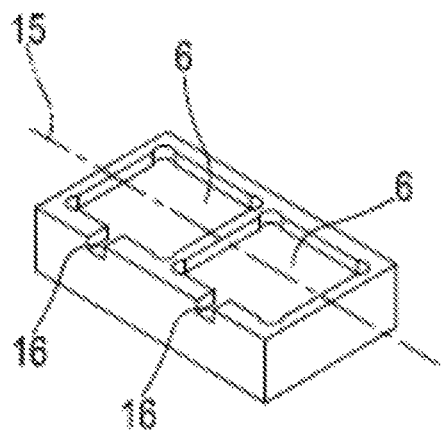
FIG. 6 shows an embodiment of a housing portion of a first support included in the device.

As shown in FIG. 2, the housing portion 5 of the first support 2 includes a plurality of seats 6 (in particular juxtaposed to each other along a main direction 15). FIG. 2 shows the presence of three seats 6. FIG. 6 shows a different embodiment of the housing portion 5 having only two seats 6. It is possible to make housing portions 5 having more than three seats 6, when required; substantially, the housing portions 5 can be made with any desired number of seats (which are not necessarily aligned to each other along the direction 15) as a function of the needs.

In addition, as it can be noted, the housing portions 5 shown in FIGS. 2 and 6 differ only with reference to the number of the seats 6; it is fundamental for the part of the housing portion 5 which is inserted into the main seat 4*a* of the constraining portion 4, to be always the same in all the different housing portions 5 so that when it is desirable to substitute one of them with another having a different number of seats 6, it is not required to substitute and/or move or act also on the constraining portion 4 (which was previously coupled to the press 3 and accurately adjusted in the work position thereof).

More generally, if the first support 2 is formed by two distinct elements, the coupling arrangement between them should enable to engage the different housing portions 5 with a different number and/or shape of the seats 6 without intervening on the relative position of the constraining portion 4 with respect to the bed 3*a* of the press 3 and without requiring further position registrations.

The first support 2 may be made of a metal material, even though the possibility of using different materials is not excluded.

Figure 10:
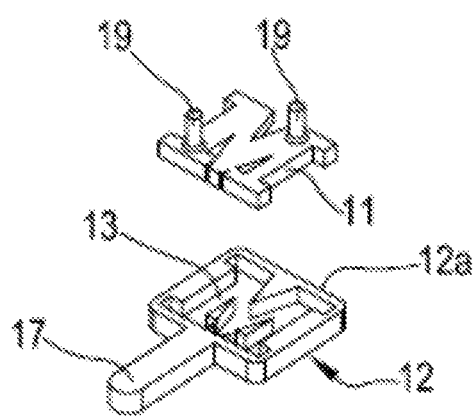
FIG. 10 shows an insert separated from a retaining element.

Now the seats 6 will be described, the same are configured for receiving each a retaining element 12. Each retaining element 12 has an external outline 12*a* (plan shape) configured for being housed in a single respective seat 6 of the housing portion 5 and has further a respective housing seat 13, centrally placed, for removably receiving one of the inserts 11 to be coupled to the sheet support S. FIG. 10 shows a retaining element 12 and an insert 11 shown in an exploded view.

It is observed that the different seats 6 have all the same external shape adapted to receive the respective retaining elements which, in turn, have the same external outline 12*a*. In this way, each seat 6 can receive indifferently any retaining element 12, in other words by considering any retaining element 12, the same could be housed in the first, second or third seat 6 by chance. As it is understandable, the retaining elements 12 differ from each other substantially for the insert 11 supported by them, in other words for the internal seat 13 receiving the insert 11 itself.

Therefore, this modularity enables to position the inserts in order to form the desired alphanumeric string on the finished sheet product.

Still in other words, by providing a reasonable number of retaining elements with the corresponding inserts, it is substantially possible to decide at present which combination of the same can be formed on the fabric/skin, by suitably simply selecting and positioning them in the respective seats 6.

In an illustratively way, by providing the three retaining elements 12 bearing the inserts 11 "A", "M" and "F" of FIG. 2, it is possible to form on the sheet support S the scripts: "AMF", "AFM", "FMA", "FAM", "MAF", "MFA"; by only three inserts. As it is understandable, the provision of a plurality of inserts (at a very low cost) enables to perform an enhanced customization which can be currently decided. In this way, a customer can for example purchase a fashion product/accessory and can customize it with inserts at the purchase by choosing both the length, and type of the script or sequence to be applied.

Referring back to the configuration of the seats 6 shown in FIG. 2, the same have a polygonal external shape, for example with four main sides, or a rectangular or square shape. The configuration of the seats 6 can have any other shape. In the areas joining two contiguous sides of the outline, there is a respective indentation 18 making smoother the operations of inserting/extracting the retaining elements 12.

By still observing FIGS. 2 and 6, it is possible to observe that the external shape of the outline of each seat 6 is open and has at least one passage 16 adapted to enable to house a respective projecting portion 17 of the retaining elements 12. The passage 16 is defined by a channel developing from the center of the housing portion 5 where the seat 6 is placed to an external side of the housing portion 5. The passage 16 enables to house the projecting portion 17 of the retaining element 12 emerging in the main development plane of the retaining element itself; the projecting portion 17 is in the shape of a tab configured for being partially housed in the passage 16 of the seat 6 and for projecting outwardly. The projecting portion 17 enables easy handling of the retaining elements 12 and extracting the same from the seat 6.

As it is understandable, not only the seat 6 and external outline 12*a* of the retaining element 12 are counter-shaped to each other, the seats 6 also have a depth slightly less (for example of one or more tenths) than or substantially equal to the thickness of the retaining elements 12. In other words, the retaining elements 12, once inserted into the respective seats 6, slightly emerge in the thickness for avoiding to "imprint" the sheet support S during the punching step and emerge substantially transversally (tab 17) to the towards/away direction 21 of the first and second supports 2, 7.

As said, the retaining elements 12 have a respective receiving seat 13 substantially counter-shaped to the insert 11 which is borne by them (see FIG. 10, for example). Moreover, the receiving seats 13 of the retaining elements 12 have an arrangement for removably retaining in position the inserts 11. In some embodiments, the retaining element 12 is configured to hold the inserts in an accurate position during all steps of positioning the same on the press 3. At the same time the device 1 also enables to simply and effectively remove the support 12 from the insert 11 when this latter is applied to the sheet support S.

The retaining arrangement can be for example undercuts, tapers of the lateral wall of the receiving seats and/or of the inserts, an interference fit between the receiving seats and inserts. The present disclosure enables removal of the insert without requiring any excessive effort or causing a damage to the insert.

In the illustrated (in a not restricted way) embodiments, the receiving seats 13 of the retaining elements 12 are through seats with undercuts at the two opposite main surfaces.

As to the materials, the retaining elements 12 can be made of a plastic material, for example, nylon.

Figure 9:
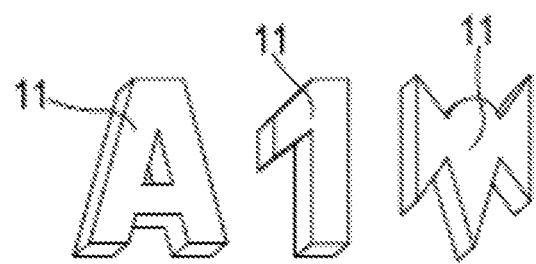
FIG. 9 shows examples of inserts.

The inserts 11, as it is understandable, can have any shape and can be, but are not limited to, alphanumeric characters or symbols (see FIG. 9, for example).

Each insert 11 may exhibit one or more pins 19 emerging from the main plane of the insert 11 away from the first support 2 when positioned in the seats 6. Different inserts 11 have a position of the pin/pins 19 different with respect to the external outline 12a of the retaining element 12 bearing them. FIG. 2 shows what is described above.

The inserts 11 can be made of a metal material, for example of a metal alloy, such as zama.

Referring to the description of the upper part of the device 1, referring again to FIG. 2, there is a second support 7 placed above having an auxiliary constraining portion 8 configured for rigidly engaging a movable element 3b of the press 3. The second support 7 also includes an auxiliary housing portion 9 having a predetermined number of auxiliary seats 10.

The illustrated embodiment shows the second support 7 consisting of two separated elements, the auxiliary constraining portion 7 and auxiliary housing portion 9. In some embodiments, the auxiliary housing portion 9 of the second support 7 is removably engaged with the auxiliary constraining portion 8 for applying to the constraining portion itself different auxiliary housing portions 9 in order to substitute the one previously mounted, therefore coupling with what was assembled at the first support 2.

Generally, but in a non-restrictive way, the second support 7 is an upper support movable towards/away from the first support 2, which is on the contrary stationary.

Moreover, the position of the second support 7 is adjustable with respect to the movable element of the press 3. In some embodiments, the device 1 includes suitable auxiliary adjusting elements (not shown) for configuring/registering the second support 7 in a plurality of different relative positions stable with respect to the movable element 3b.

Also, in this embodiment, once the position of the auxiliary constraining portion 8 is registered, it is no more necessary to act on the position thereof when the auxiliary housing portion 9 is substituted with a different one.

In a further embodiment, it is possible to provide an integrally made second support 7. In other words the auxiliary housing portion 9 is unmovably fixed to the auxiliary constraining portion 8. In other words, the portions 8 and 9 can be a single body.

Figure 7:
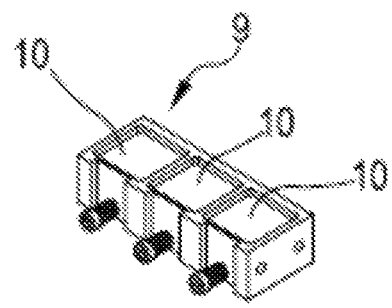
FIG. 7 is a bottom view of a first embodiment of an auxiliary housing portion of a second support included in the device.
Figure 8:
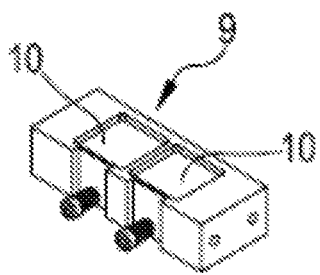
FIG. 8 shows a bottom view of a second embodiment of the auxiliary housing portion of the second support included in the device.

Now, it should be mentioned that, unlike the seats 6, the predetermined number of auxiliary seats 10 of the auxiliary housing portion 9 can be a single seat 10 (this embodiment is not shown in the figures) or a plurality of auxiliary seats 10 (two or more as shown in FIGS. 7 and 8).

The auxiliary seat 10 may be configured for holding the position of the constraining elements 14 (in other words the counter-plates) which, since are coupled to the inserts oppositely to the supports S, enable a stable constraint of the insert to the support itself.

If there is only one seat 10, there are some possible embodiment variants.

In a first variant, the auxiliary seat 10 directly receives a single counter-plate or constraining element 14. This latter will have a suitable size, in other words if it is, for example, provided the application of three inserts 11, it will have a length such to bear the seat or seats 21 destined to receive the pins 19 of all the inserts to be coupled by the hammering step. If each insert has two pins 19 and there are three inserts, the single constraining element 14 will have at least six seats 21 positioned at the cited pins 19 for being capable of engaging all.

This solution is not optimal even though it ensures the operation of the device because it provides the availability of many different constraining single elements for coupling, the elements 14 exhibiting the necessary position combinations of the seats 21, to plural inserts 11; moreover, the finished applied insert will have a determined rigidity provided by the counter-plate.

Figure 5:
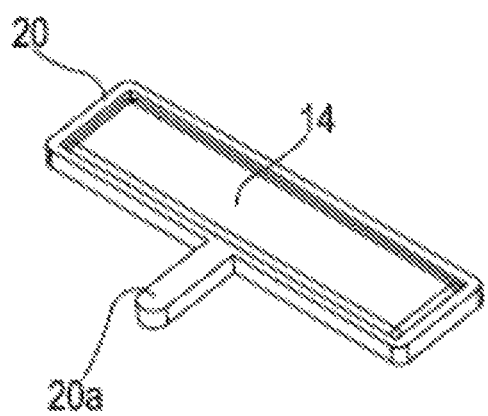
FIG. 5 shows a third embodiment of a constraining element.

In an alternative embodiment, the single constraining element 14 is not directly engaged with the auxiliary seat 10, but is borne by a supporting body 20 which in turn is engaged into the auxiliary seat 10. The supporting body 20 can be provided with or without a tab 20a for being positioned and extracted. This particular solution is shown in FIG. 5.

In some embodiments, there may be a plurality of constraining elements 14, one for each insert to be constrained to the support S because of the modularity.

FIG. 2 shows three counter-plates (three constraining elements 14) which are engaged in three respective auxiliary seats 10 (see FIG. 7—the housing element is shown from the bottom) for example by a slight interference or by small springs retaining the counter-plate in a position. The counter-plates in FIG. 2 have blind seats 21 (placed on a side not shown in the figure) positioned at the pins 10 of the inserts.

Figure 3:
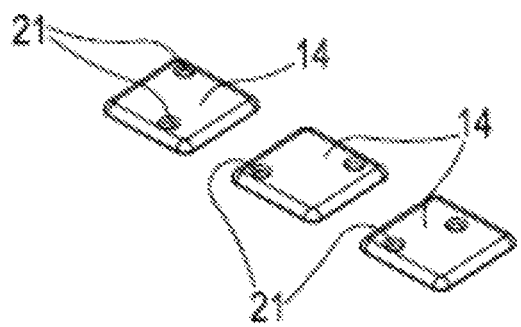
FIG. 3 shows a first embodiment of a constraining element.

As an alternative, the constraining elements 14 could be of the type shown in FIG. 3, in other words provided with through seats 21 for receiving the cited pins 19 and for enabling a simple hammering step; also in this embodiment, the counter-plates can be directly retained in the auxiliary seats 10 of the auxiliary housing portion 9.

Figure 4:
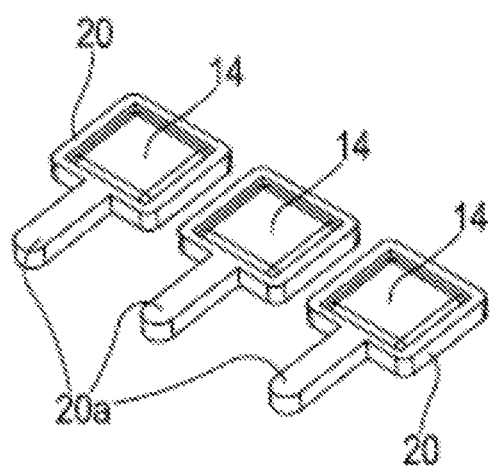
FIG. 4 shows a second embodiment of a constraining element.

FIG. 4 illustrates a possible alternative embodiment wherein each of the constraining elements 14 is removably borne by a respective supporting body 20 which, in turn, engages the respective auxiliary seat 10.

In the disclosed embodiments, in case of single constraining elements, it is important that the same are interchangeable from the point of view of the position and engagement with the auxiliary seats 10 of the auxiliary housing portion 9. If the engagement is direct, they should have an external outline identical to each other and adapted to be coupled to each (any) auxiliary seat 10 (also equal to each other). If a supporting body 20 is used for each constraining element (FIG. 4), then the constraining elements themselves could have the same or a different outline, however the several supporting body 20 should have the same external outline counter-shaped to the auxiliary seat 10 for being capable of positioning them where it is most required.

In some embodiments, the number of the auxiliary seats 10 could vary if a different number of inserts are engaged (compare FIG. 7 and FIG. 8, for example).

In some embodiments, in case of constraining elements 14, one for each insert 11 to be applied, the number of the seats 6 of the first support 2 may be equal to the number of the auxiliary seats 10 of the second support 7, and the two supports 2, 7 may be accurately aligned so that the inserts 11 and the respective constraining elements 14 may be on the same axis for ensuring a reciprocal engagement.

Although the figures show the first support 2 in a lower position and constrained to the stationary bed of the press 3, and the second support 7 in an upper position and constrained to the movable part of the press 3, it is observed that the positions of the supports 2 and 7 could be exchanged, in other words the first support 2 bearing the inserts 11 can be positioned above, coupled to the movable element and the second support 7 can be positioned below. In some embodiments, just the lower part of the press 3 bearing the first support 2 can be movable or both the upper and lower parts can be movable, in other words the first and second supports relatively approaching each other.

In some embodiments, the use of plastic materials is not prevented with reference to each of the components and to the respective described parts.

Based on the structural description, the operation of the device is described as follows.

During the customizing step, it is decided (by the customer, for example) how many and what inserts 11 will be applied to the sheet support S (for example to a bag). Therefore, the housing portion 5 having the number of necessary seats 6 (2 for applying on the product the initials, for example) is engaged in the supporting portion 4. Then, it is applied the respective selected auxiliary housing portion 9 (for example having the same number of seats for the counter-plates).

Therefore, the retaining elements 12 bearing the desired inserts are positioned in the seats 6 and the corresponding counter-plates are positioned in the auxiliary seats 10.

The sheet support is placed between the two supports 2, 7 and therefore a press 3 is started in order to unmovably constrain the inserts to the counter-plates, the support being interposed in between.

Therefore, any type of customization can be obtained in a short time and without requiring industrial machines or a manufacturing skillfulness.

The invention claimed is:

1. A device for applying inserts on a sheet support, comprising:
    a first support for a press having a constraining portion configured for rigidly engaging a bed of the press and a housing portion having a plurality of seats;
    a second support for the press having a respective auxiliary constraining portion configured for engaging an element of the press and an auxiliary housing portion having a predetermined number of auxiliary seats, the first and second supports being relatively movable towards or away from each other along a displacement direction;
    a plurality of inserts to be applied on the sheet support;
    a plurality of retaining elements, each having an external outline configured for being housed in a respective seat of the housing portion of the first support, and a respective receiving seat for removably receiving one of the inserts; and
    a predetermined number of constraining elements associable to the predetermined number of auxiliary seats of the auxiliary housing portion of the second support and configured for being constrained, in use, to the inserts,
    wherein each insert has at least two pins emerging from a main plane of the insert away from the first support, and different inserts of the plurality have a different position of the pins with respect to the external outline of the retaining element supporting them.

2. The device according to claim 1, wherein the housing portion of the first support is removably engaged to the constraining portion, and the constraining portion has a main seat to receive and retain the housing portion.

3. The device according to claim 1, wherein:
    the seats of the housing portion of the first support are arranged side-by-side along a main direction,
    the seats of the housing portion have the same external shape adapted to receive respective retaining elements having the same external outline,
    the retaining elements having the same external outline adapted to be received in the seats of the housing portion, and
    each of the seats of the housing portion and the external outline of each of the retaining elements being counter-shaped to each other.

4. The device according to claim 1, wherein:
    each seat of the housing portion has an open external shape having at least one passage adapted to enable housing a projecting portion of the retaining elements, the at least one passage is defined by a channel developing from an external side of the housing portion of the first support to an inside of the seat, and
    each retaining element having a projecting portion emerging in a main development plane of the retaining element and configured for being housed in the respective passage of the seat.

5. The device according to claim 1, wherein the seats of the housing portion have a depth less than or at most substantially equal to a thickness of the retaining elements.

6. The device according to claim 1, wherein:
    a position of the first support is adjustable with respect to the bed of the press;
    the device comprises adjusting elements for configuring the first support in a plurality of different relative stable positions with respect to the bed;
    a position of the second support is adjustable with respect to a movable element of the press; and
    the device comprises auxiliary adjusting elements for configuring the second support in a plurality of different relative stable positions with respect to the movable element.

7. The device according to claim 1, wherein:
    the constraining portion has a main seat to receive and retain a position of the housing portion,
    the device further comprises a plurality of housing portions having the same external shape configured for being received in the main seat and for retaining the position by the constraining portion, and
    the plurality of housing portions being different from each other due to the number of seats.

8. The device according to claim 1, wherein:
    the predetermined number of auxiliary seats of the auxiliary housing portion comprises a plurality of auxiliary seats,
    the predetermined number of constraining elements comprises a plurality of constraining elements each comprising engaging elements for receiving, by a permanent constraint, at least one insert,
    the engaging elements comprise seats for receiving respective pins of the inserts,
    the seats of the engaging elements are through seats,
    the constraining elements for different inserts have seats positioned in different areas having a position corresponding to one of the pins of the inserts to which they are stably coupled.

9. A kit for applying inserts on a sheet support, the kit comprising:
    a plurality of inserts to be applied on the sheet support;
    a plurality of retaining elements, each having an external outline configured for being housed in a respective seat of a first support of a press and a respective receiving seat for removably receiving one of the inserts, wherein the first support has a constraining portion configured for rigidly engaging a bed of the press;
    a predetermined number of constraining elements associable to a predetermined number of auxiliary seats of a second support of the press and configured for being constrained, in use, to the inserts, wherein the second support has a respective auxiliary constraining portion configured for engaging an element of the press, the first and second supports being relatively movable towards or away from each other along a displacement direction,
    wherein each insert has at least two pins emerging from a main plane of the insert away from the first support, and different inserts of the plurality have a different position of the pins with respect to the external outline of the retaining element supporting them.

10. The kit according to claim 9, wherein:
the retaining elements are made of a plastic material comprising nylon and have respective receiving seats counter-shaped to the insert which they support,
the receiving seats of the retaining elements have elements for removably retaining a position of the inserts, and
the inserts are made of a metal material comprising a metal alloy or zama, and
the retaining elements include undercuts, tapers of a lateral wall of the receiving seats or the inserts, or a mechanical interference between the receiving seats and the inserts.

11. The kit according to claim 9, wherein the retaining elements have the same external outline.

12. The kit according to claim 9, wherein each of the retaining elements has a projecting portion emerging in the main development plane of the retaining element, the projecting portion being in the shape of an elongated tab for handling the retaining element.

13. The kit according to claim 9, wherein the receiving seats of the retaining elements have elements for removably retaining the position of the inserts.

14. A method for applying a plurality of inserts on a sheet support using a device comprising a first support, a second support, the plurality of inserts, a plurality of retaining elements, and a predetermined number of constraining elements, the method comprising:
positioning the plurality of retaining elements in a housing portion of the first support for a press having a constraining portion configured for rigidly engaging a bed of the press and the housing portion having a plurality of seats, each retaining element having an external outline configured for being housed in the respective seat of the housing portion of the first support, each retaining element having a respective receiving seat for removably receiving one of the inserts, each retaining element being capable of being positioned in any of the seats according to a sequence of inserts to be made, engaged with the sheet support;
positioning the predetermined number of constraining elements in an auxiliary housing portion of the second support for the press having a respective auxiliary constraining portion configured for engaging an element of the press and an auxiliary housing portion having a predetermined number of auxiliary seats, the first and second supports being relatively movable towards or away from each other along a displacement direction;
positioning the sheet support with which the inserts will be engaged between the first and second supports;
applying the plurality of inserts to the sheet support, wherein each insert has at least two pins emerging from a main plane of the insert away from the first support, and different inserts of the plurality have a different position of the pins with respect to the external outline of the retaining element supporting them;
closing the press by approaching the first and second supports for exerting a pressure on the inserts and the constraining elements for obtaining a stable coupling of the same, the sheet support being interposed in between; and
opening the press for extracting the sheet support bearing on a side thereof the plurality of inserts and on the other one, the predetermined number of constraining elements.

15. A device for applying inserts on a sheet support, comprising:
a first support for a press having a constraining portion configured for rigidly engaging a bed of the press and a housing portion having a plurality of seats;
a second support for the press having a respective auxiliary constraining portion configured for engaging an element of the press and an auxiliary housing portion having a predetermined number of auxiliary seats, the first and second supports being relatively movable towards or away from each other along a displacement direction;
a plurality of inserts to be applied on the sheet support;
a plurality of retaining elements, each having an external outline configured for being housed in a respective seat of the housing portion of the first support, and a respective receiving seat for removably receiving one of the inserts; and a predetermined number of constraining elements associable to the predetermined number of auxiliary seats of the auxiliary housing portion of the second support and configured for being constrained, in use, to the inserts, wherein:
the retaining elements are made of a plastic material comprising nylon and have respective receiving seats counter-shaped to the insert which they support,
the receiving seats of the retaining elements have elements for removably retaining a position of the inserts,
the inserts are made of a metal material comprising a metal alloy or zama, and
the retaining elements include undercuts, tapers of a lateral wall of the receiving seats or the inserts, or a mechanical interference between the receiving seats and the inserts.

16. The device according to claim 15, wherein each insert has at least two pins emerging from a main plane of the insert away from the first support, and different inserts of the plurality have a different position of the pins with respect to the external outline of the retaining element supporting them.

\* \* \* \* \*